United States Patent [19]

Tsunehiro

[11] Patent Number: 5,569,965
[45] Date of Patent: Oct. 29, 1996

[54] CONTROL METHOD FOR REDUCING QUIESCENT CURRENT

[75] Inventor: Naoshi Tsunehiro, Tokyo, Japan

[73] Assignee: Matsushita Electric Industrial Co., Ltd., Osaka, Japan

[21] Appl. No.: 231,481

[22] Filed: Apr. 22, 1994

[30] Foreign Application Priority Data

Nov. 29, 1993 [JP] Japan .................................. 5-297749

[51] Int. Cl.$^6$ ................................................ H04M 11/00
[52] U.S. Cl. ........................... 307/10.1; 379/58; 455/343
[58] Field of Search .................................. 307/9.1, 10.1, 307/10.7, 48, 52, 62, 141, 141.4, 43, 85–87, 64, 66; 379/58; 455/343, 127

[56] References Cited

U.S. PATENT DOCUMENTS

| | | | |
|---|---|---|---|
| 3,808,537 | 4/1974 | Sarati et al. | 379/58 |
| 4,962,543 | 10/1990 | Kuge et al. | 455/343 |
| 5,149,985 | 9/1992 | Fujiwara | 307/10.7 |
| 5,220,681 | 6/1993 | Belgin | 455/343 |
| 5,335,264 | 8/1994 | Namekawa | 379/58 |

Primary Examiner—William M. Shoop, Jr.
Assistant Examiner—Richard T. Elms
Attorney, Agent, or Firm—Watson Cole Stevens Davis, P.L.L.C.

[57] ABSTRACT

A control method applicable to a battery-driven portable device such as a portable radio telephone device for suppressing quiescent currents appearing when the device is not under operation, thereby extending the useful service life of an external power source such as a battery. In one example, required power inputs supplied to power input terminals for activating the total device system act as trigger inputs to a power control circuit including a pulse generator circuit, thereby generating a pulse during only a period controllably determined by a CR time constant circuit connected additionally to the pulse generator, and a CPU confirms sufficient conditions required for activating the system on the basis of outputs appearing on ports of the power control circuit. Only when the CPU decides that the power inputs to the system satisfy the sufficient conditions required for activating the system, the CPU sets a flag on a terminal to indicate that the system is to be activated, thereby starting operations of various regulators of the telephone device.

31 Claims, 7 Drawing Sheets

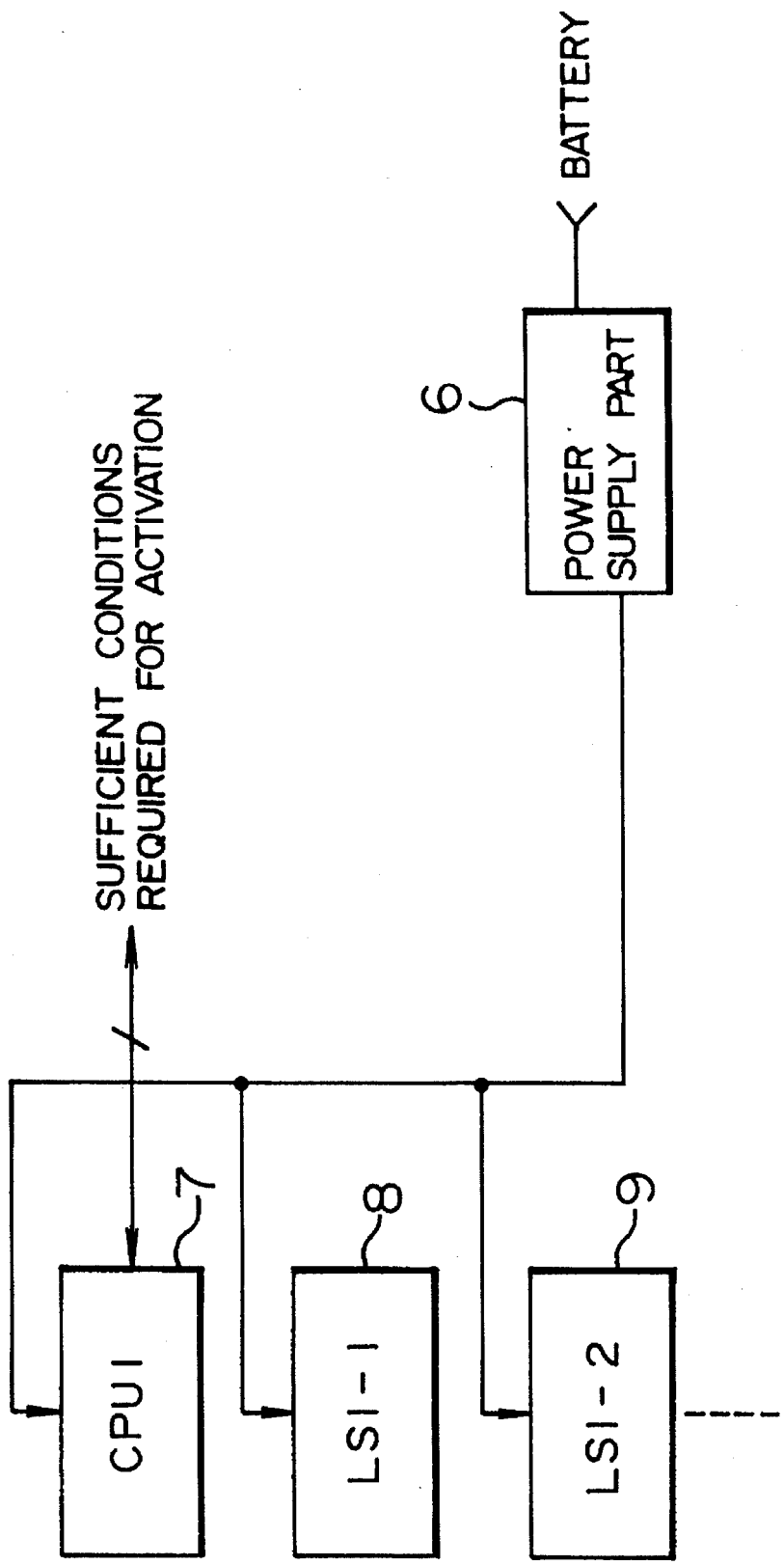

CONTROL METHOD FOR REDUCING QUIESCENT CURRENT

BACKGROUND OF THE INVENTION

This invention relates to battery-driven portable devices of small size such as a portable radio telephone device, and more particularly, to a method in which pulse inputs are supplied to such a device for checking conditions of input power supplies and controlling activation or enabling of the device thereby reducing quiescent currents flowing in the device.

FIG. 6 is a block diagram showing the structure of a prior art power input controller used in such a portable radio telephone device. In FIG. 6, the reference numerals 1, 2, 3, 4 and 5 designate a power supply part, a first CPU (CPU1), a first LSI (LSI-1), a second LSI (LSI-2), and a second CPU (CPU2), respectively. A power supply voltage from a battery is normally continuously supplied to both the power supply part 1 and the second CPU 5 (CPU2), and, depending on the result of confirmation by the second CPU 5 (CPU2) which decides whether or not the sufficient conditions required for activating the device are satisfied, the power supply voltage from the power supply part 1 to the first CPU 2 (CPU1), the first LSI 3 (LSI-1) and the second LSI 4 (LSI-2) is turned on-off at the power supply part 1.

FIG. 7 is a block diagram showing the structure of another prior art power input controller used in a portable radio telephone device. In FIG. 7, the reference numerals 6, 7, 8 and 9 designate a power supply part, a CPU (CPU1), a first LSI (LSI-1), and a second LSI (LSI-2) respectively. A power supply voltage from a battery is normally continuously supplied from the power supply part 6 to be supplied to the CPU 7 (CPU1), the first LSI 8 (LSI-1) and the second LSI 9 (LSI-2), and the CPU 7 (CPU1) checks to confirm the sufficient conditions required for activating or power feeding the device when the above conditions are supplied to the CPU 7 (CPU1) by, for example, interruption (stop mode of CPU normal internal/external oscillation: power saving mode).

However, in the case of the prior art power input controller shown in FIG. 6, the power supply voltage is normally continuously supplied to the second CPU5 (CPU2). Consequently, the sum of a quiescent current in the power supply part 1 itself and a stand-by current in the second CPU 5 (CPU2) itself provides a quiescent current in the whole system. Also, in the case of the prior art power input controller shown in FIG. 7, the power supply voltage is normally continuously supplied to all of the CPU 7 (CPU1), the first LSI 8 (LSI-1) and the second LSI 9 (LSI-2). Consequently, the sum of a quiescent current in the power supply part 6, a stand-by current in the CPU 7 (CPU1), a stand-by current in the first LSI 8 (LSI-1) and a stand-by current in the second LSI 9 (LSI-2) provides a quiescent current in the whole system. Thus, in each of the prior art power input controllers shown in FIGS. 6 and 7, the flow of the quiescent current in the whole system consumes a current value of about 100 µA, and they have had a problem that the effect of current saving was not enough. Particularly, in the case of the prior art controller shown in FIG. 7, the quiescent current in the whole system tended to be greatly affected by a stand-by current in a device in which the controller is to be incorporated. Therefore, the above fact had to be carefully considered for the selection of the device.

SUMMARY OF THE INVENTION

With a view to solve such prior art problems, it is an object of the present invention to provide a control method which can satisfactorily reduce the quiescent current while exhibiting a marked effect of current saving, preferably when applied to a battery-driven portable device of small size, such as, a portable radio telephone device.

According to a typical aspect of the present invention which attains the above object, there is provided a control method for reducing a quiescent current in a battery-driven portable device of small size, comprising the steps of supplying a plurality of power inputs as factors for triggering generation of a pulse signal indicating establishment of necessary conditions required for activating the device for its normal operation, and deciding to activate the device only when the supplied power inputs satisfy the sufficient conditions required for activating the device for its normal operation.

Therefore, according to the present invention, the power supply voltage is normally continuously supplied only to a logic circuit block and a pulse generator circuit block provided for confirmation of the necessary and sufficient conditions required for activation of a given whole system, so that the quiescent current in the system can be greatly reduced, and reactive or ineffective currents appearing when the system is not under operation can be minimized, thereby extending the useful service life of the external power source, such as, the battery.

BRIEF DESCRIPTION OF THE DRAWINGS

FIG. 7 is a block diagram showing the structure of another prior art power input controller.

DESCRIPTION OF THE PREFERRED EMBODIMENT

Figure 1:
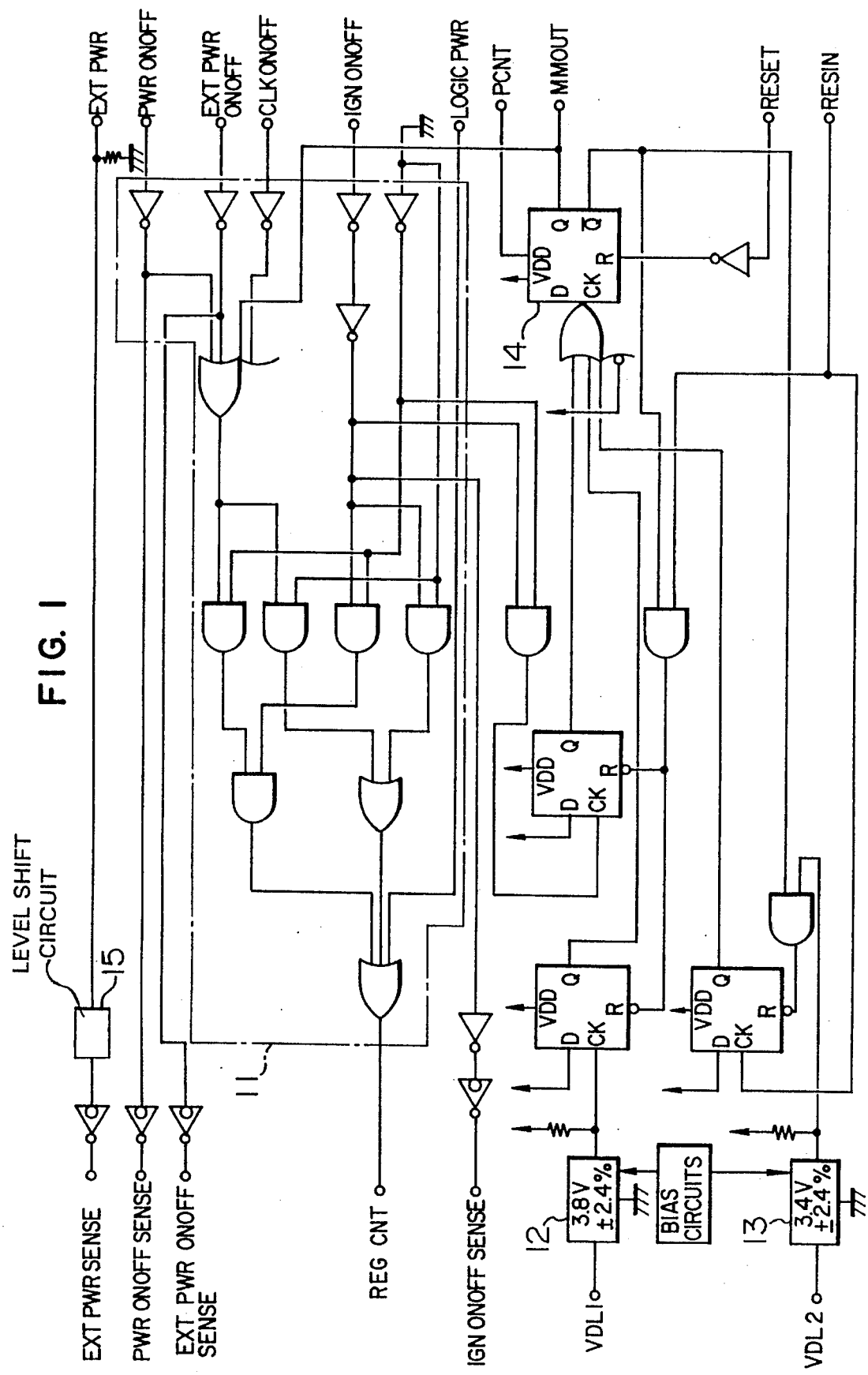
FIG. 1 is a block diagram showing the structure of a power control circuit incorporated in a portable radio telephone device according to an embodiment of the method of the present invention.

FIG. 1 is a block diagram showing a power control circuit incorporated in a portable radio telephone device according to an embodiment of the method of the present invention. The power control circuit shown in FIG. 1 includes a logic circuit block and a pulse generator circuit block provided for confirmation of power inputs satisfying sufficient conditions required for activating the system. A conventional portable radio telephone device includes an internal power supply part in the form of a battery pack (e.g., of removable battery or cells), a CPU, and an IC part in which various kinds of regulators as described later are integrated. The power control circuit of the present invention is added to the components of the conventional portable radio telephone device. The logic circuit block includes a logic circuit 11 and battery voltage sensor circuits 12 and 13 required for check of abnormal battery voltages and for generation of the pulse signal. The pulse generator circuit block includes a one-shot multivibrator 14 whose output pulse width can be selected according to the time constant of an externally mounted time constant circuit TC. A level shift circuit 15 is connected to an external power source other than the battery pack. The power supply voltage from the battery is supplied through terminals VBATT to all the logic elements in the power control circuit. Such a telephone device may be used in various use states such that the device is carried with a user, or used in a running car or used in a user's house and fed from a commercial power line. When such a use state is changed, the electric power source for the device may be also changed for the respective use state.

The abbreviated symbols appearing between the top and the bottom on the right-hand side of FIG. 1 will now be described. EXT PWR designates an input terminal connected to such an external power source other than the battery pack. PWR ONOFF designates an input terminal for a power input supplied by manipulation of a power key switch, and from the battery pack or the external power source, for example. EXT PWR ONOFF designates an input terminal for a power input supplied by manipulation of an external switch and from the external power source (other than that of the portable radio telephone device). CLK ONOFF designates an input terminal for a power input supplied under control of and from, for example, a clock IC functioning as a timer. IGN ONOFF designates an input terminal for a power input supplied under control of a car ignition switch. LOGIC PWR designates an input terminal for a power input supplied from a computing unit or CPU (central processor unit) schematically shown in FIG. 5. PCNT designates a connection terminal for a time constant circuit TC comprising an externally mounted combination of a capacitor C and a resistor R for adjusting the pulse width of the output MMOUT of the one-shot multivibrator 14. MMOUT designates a pulse output terminal. RESCNT designates a reset terminal for the one-shot multivibrator 14. RESIN designates a clear terminal for a voltage sense/ receive D.FF.

Specifically and for example, the battery pack is a power source for the telephone device to be carried freely by a user without being electrically connected to an external power source such as a car battery. The external power source (EXT PWR) represents an electric power supply from a car battery or a commercial power line in a user's house via an optional device such as a handsfree or booster or conversion adapter for such external electric source. The electric power input under control of timer function (CLK ONOFF) represents a power supply automatically supplied from the device power source (battery pack) to the telephone device at a time selectively set by the user's setting of a clock IC provided in the device, even with the power source not supplying power to the device before the set time. With the power supply from the set time and without power consumption of the device power source before the set time the telephone device can be automatically started to operate, thus saving electric power of the battery pack. The electric power input under control of an ignition switch (IGN ONOFF) represents a power supply to the device from a car battery via an option al adapter interlocked with and under control of operation of the ignition switch, thus saving electric power of the car battery.

The abbreviated symbols appearing between the top and the bottom on the left-hand side of FIG. 1 will now be described. EXT PWR SENSE designates an output port for confirming the supply of the power input from the external power source other than the battery pack. PWR ONOFF SENSE designates an output port for confirming the supply of the power input by manipulation of the power key. EXT PWR ONOFF SENSE designates an output port for confirming the supply of the power input from the external power source (other than that of the portable radio telephone device). REG CNT designates an output terminal for the pulse signal generated in response to the supply of the power inputs from those including the one-shot multivibrator 14 to decide that all the power inputs required to activate the portable radio telephone device are now supplied to place the device in operation. IGN ONOFF SENSE designates an output port for confirming the supply of the power input by the ignition. VLD1 and VLD2 designate battery voltage detection input terminals.

Figure 2:
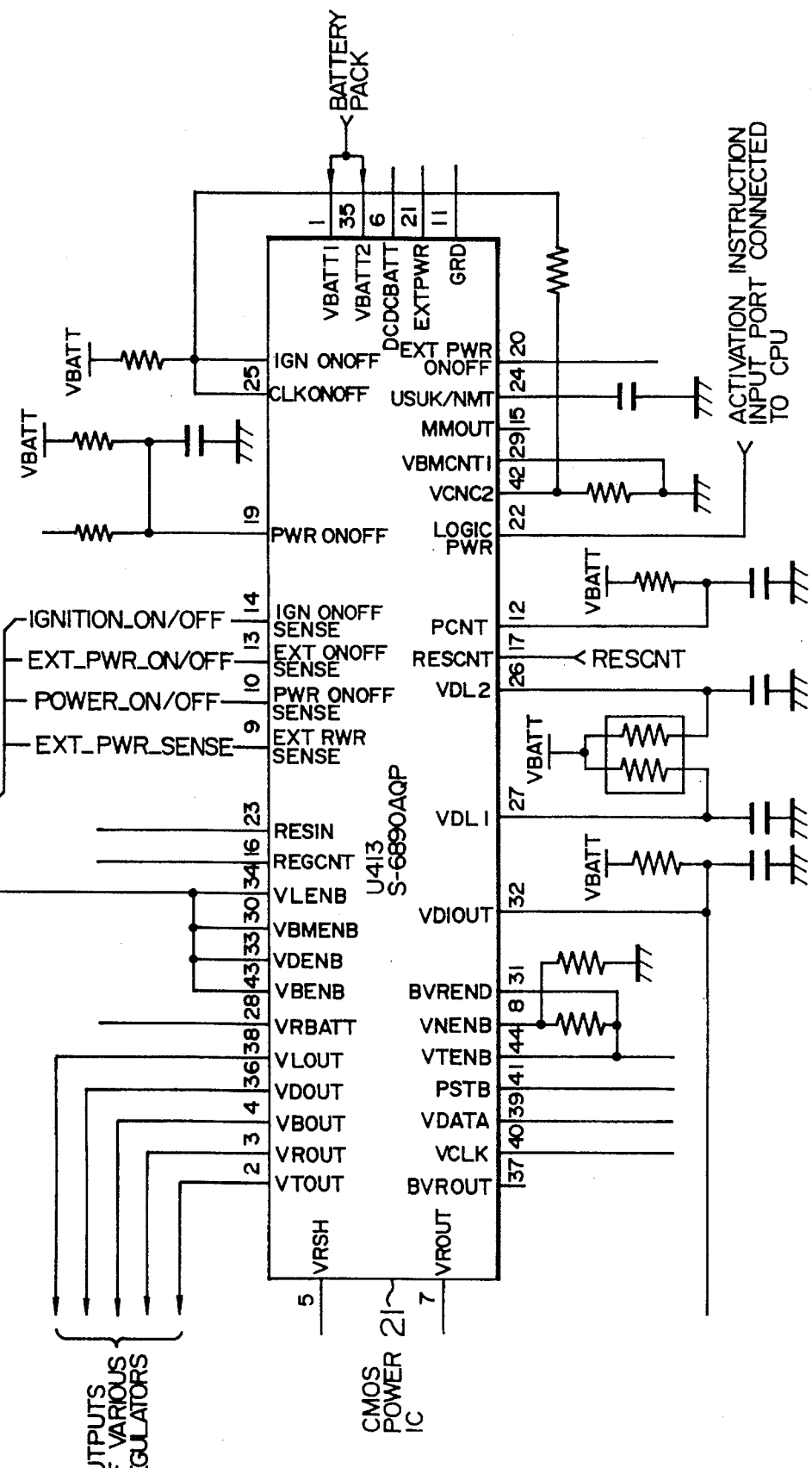
FIG. 2 is a connection diagram of a CMOS power IC in which the power control circuit shown in FIG. 1 is incorporated.

FIG. 2 is a connection diagram of a CMOS power IC 21 in which the power control circuit and various kinds of regulators required for the operation of the portable radio telephone device are integrated. This CMOS power IC is sold under the trade name of U413 S6890 AQP, and the same abbreviated alphabetic symbols as those appearing in FIG. 1 are used in FIG. 2. Referring to FIG. 2, the battery voltage from the battery pack regarded as an external power source is supplied to the voltage detection input terminals VLD1 and VLD2 shown on the lower side of FIG. 2, and the terminal PCNT is connected to the externally mounted combination of the C and R elements acting to adjust the pulse width of the pulse signal from the output MMOUT of the pulse generator circuit 14. The battery pack is connected to the terminals VBATT1 and VBATT2 shown on the right-hand side of FIG. 2. The power inputs providing the factors for establishing necessary conditions required for activating the system (the whole portable radio telephone device) are supplied from the terminals PWR ONOFF, CLK ONOFF and IGN ONOFF shown on the upper side of FIG. 2 and from the terminal EXT PWR ONOFF shown on the lower side of FIG. 2, respectively. Further, the ports EXT PWR SENSE, PWR ONOFF SENSE, EXT PWR ONOFF SENSE and IGN ONOFF SENSE shown on the upper side of FIG. 2 act respectively as the output ports for checking whether or not the required power inputs are supplied to the CPU to provide thereto the factors for the check of continuous or normal activation of the portable radio telephone device, and the CPU confirms establishment of the sufficient conditions required for the activation of the portable radio telephone device. Instruction outputs from the CPU to turn on-off the various regulators are supplied to regulator on-off instruction input ports VBENB, VDENB, VBMENB and VLENB. Terminals VTOUT, VROUT, VBOUT, VDOUT and VLOUT act as outputs ports where the operation signals of the various regulators appear respectively.

The operation of the above embodiment of the present invention will now be described. In the power control circuit shown in FIG. 1, the following logical expression may be used, for example, to set forth the output conditions for generation of the pulse at the pulse signal output terminal REG CNT:

{(PWR ONOFF $\vee$ EXT PWR ONOFF $\vee$ CLK ONOFF) $\wedge$ IGN ONOFF} $\vee$ LOGIC PWR On the other hand, as necessary conditions required for normal or continuous activation of the system (the whole portable radio telephone device), the power inputs to the terminals PWR ONOFF, EXT PWR ONOFF, CLK ONOFF, IGN ONOFF and VDL1, VDL2 are determined beforehand, and these inputs act to generate the trigger input supplied to the terminal CK of the one-shot multivibrator 14. As a result, the pulse signal whose pulse width is determined by the externally connected CR combination circuit appears at the terminal MMOUT of the one-shot multivibrator 14 to drive the CPU (software initialization processing time). On the other hand, the outputs appearing at the ports EXT PWR SENSE, PWR ONOFF SENSE, EXT PWR ONOFF SENSE and IGN ONOFF SENSE are supplied to the corresponding terminals of the CPU so that the CPU can confirm establishment of the sufficient conditions required for the normal activation of the portable radio telephone device. When the CPU decides that the power inputs to the system (the portable radio telephone device) satisfy the sufficient conditions required for activating the portable radio telephone device, the CPU sets flag on the terminal LOGIC PWR. Consequently, the above logical expression holds to decide now that the portable radio telephone device is to be activated, and the terminal REG CNT is turned on so that the various regulators start to operate.

Figure 3:
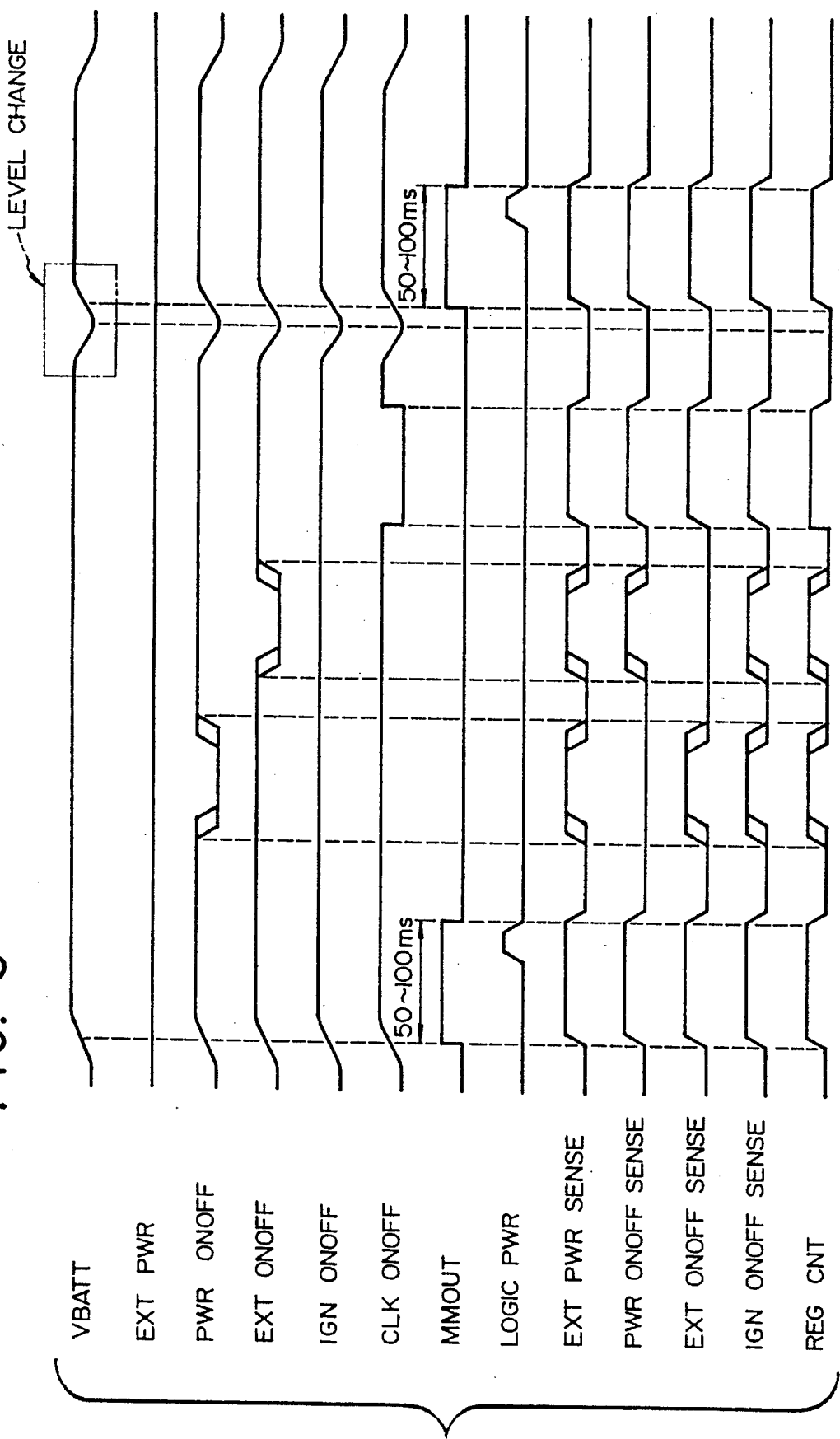
FIGS. 3 and 4 are timing charts of voltage waveforms generated at circuits of FIG. 1 used in different states.
Figure 4:
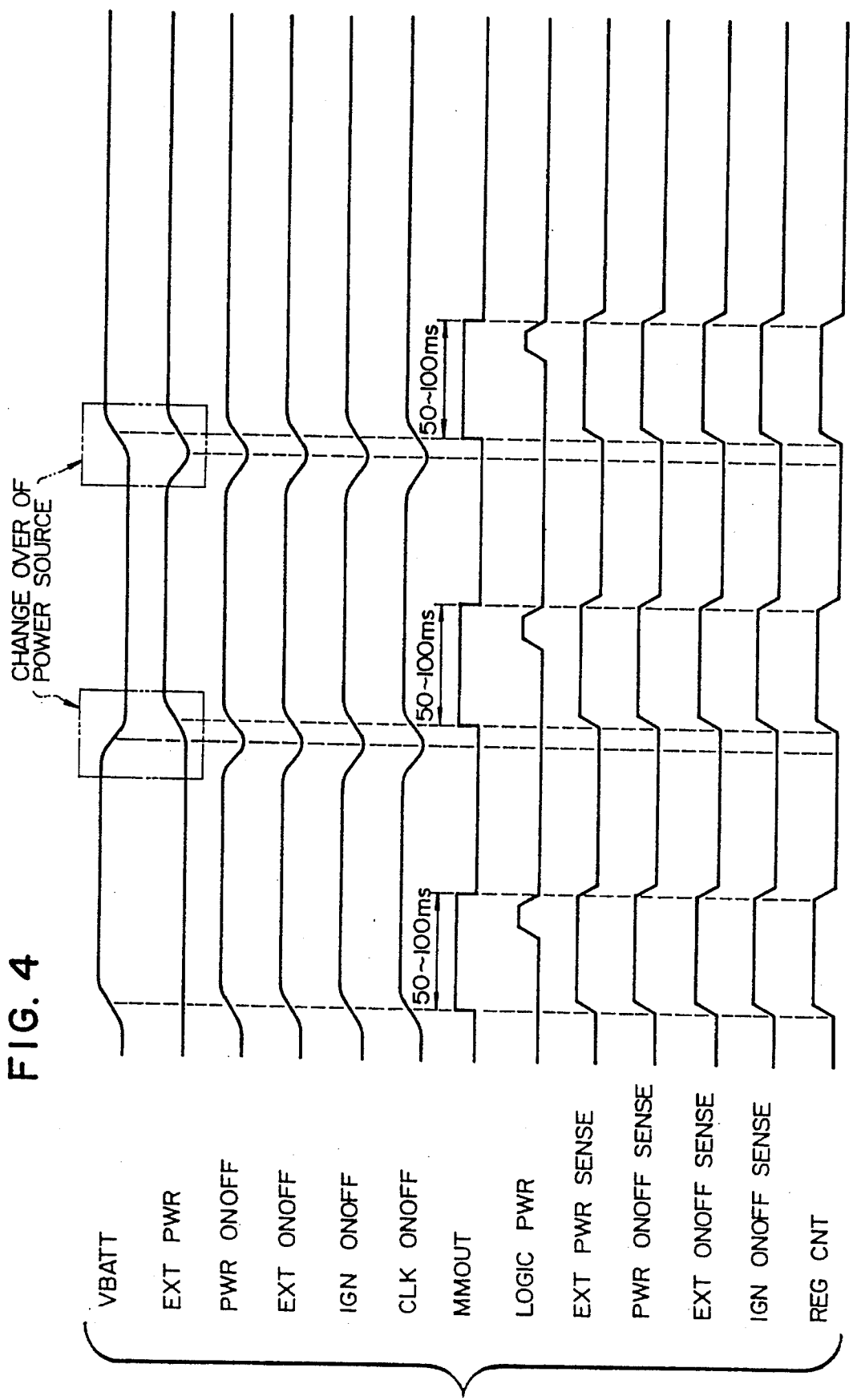
Figure 5:
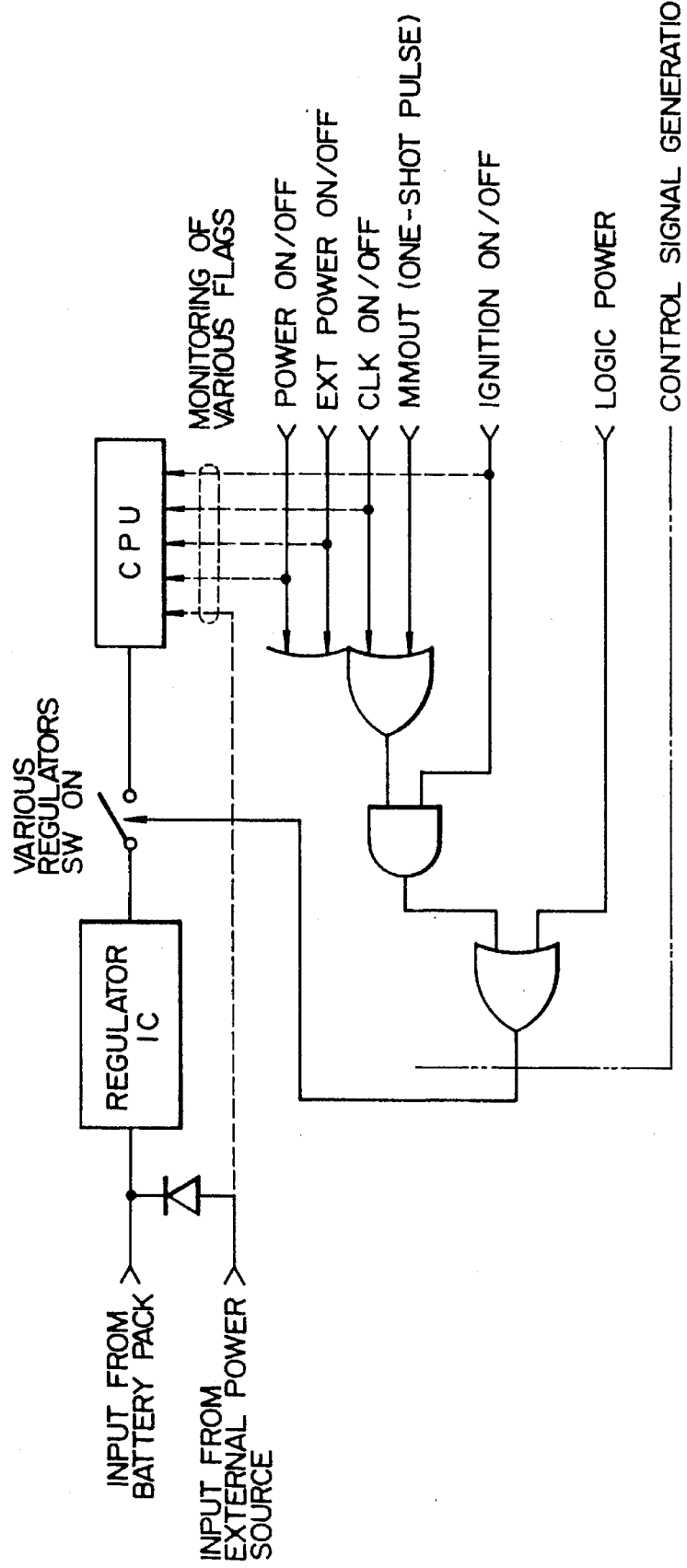
FIG. 5 is a connection diagram of circuit portions of the device.
Figure 6:
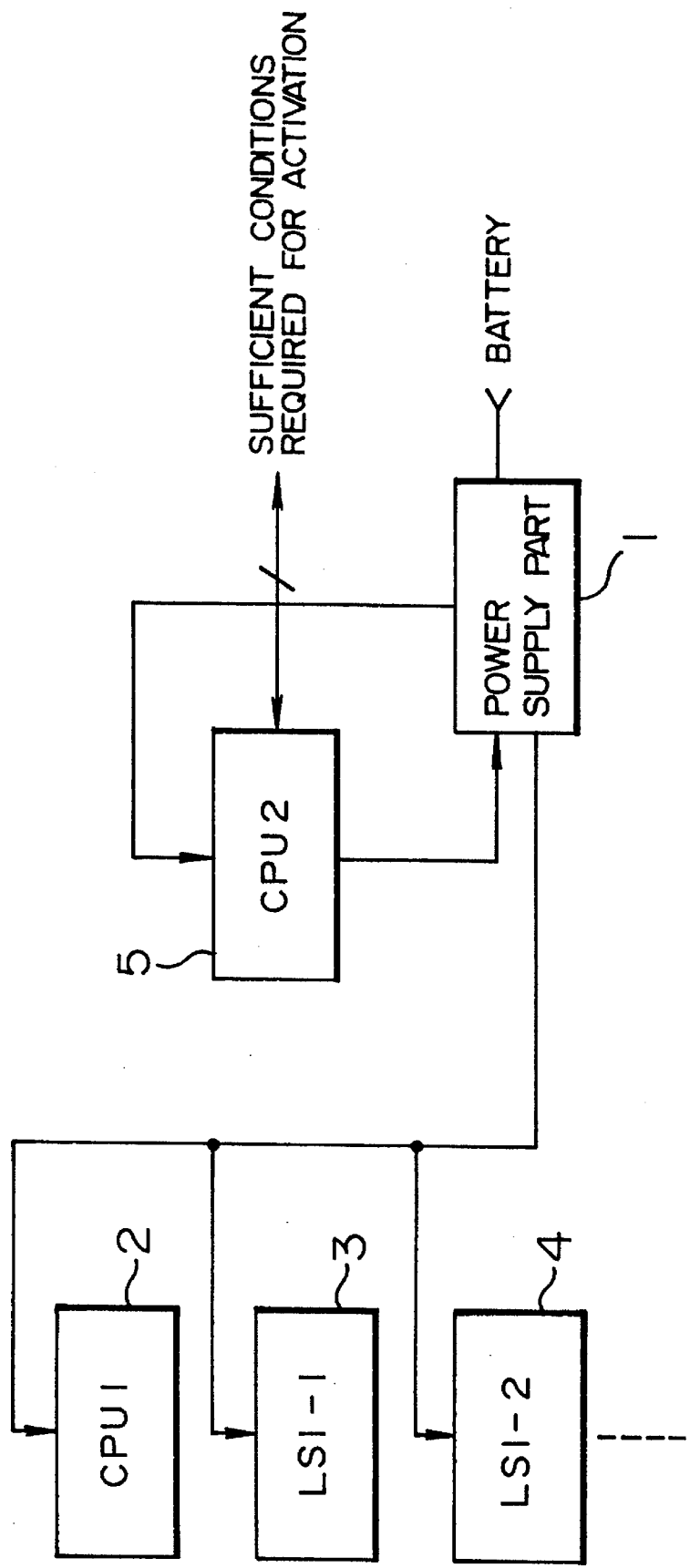
FIG. 6 is a block diagram showing the structure of a prior art power input controller.

FIG. 3 is a timing chart of voltage waveforms generated at input and output terminals of the circuit shown in FIG. 1 in the case of a radio telephone device using the circuit and carried by a user. FIG. 4 is a timing chart of similar voltage waveforms in the case of the circuit shifted from a user's carried state to a use state in a car. Reference abbreviations (VBATT; EXPWR; etc.) correspond to those in FIG. 1. In FIG. 3 a level change of "low"⇆"high" of waveform VBATT occurs at a time of battery exchange.' The CPU checks each SENSE output when it is temporarily enabled, such as during a period of a high level output pulse from the terminal MMOUT of the multivibrator 14. As a result of the check, a high level of LOGIC PWR is generates at about 60 msec after generation of the MMOUT. FIG. 5 is a connection diagram of various power sources, a power control circuit portion, a CPU and a regulator IC portion.

As is apparent from the foregoing, the control may be effected such that each signal factor of the foregoing logical equation urges the signal REG CNT to be temporarily high for a temporary power supply to the controlled portion such as the CPU, thereby checking by the flags of the related voltage signals if the sufficient condition has been established. Thus, a decision is made whether a subsequent continuous power supply should be effected.

The input signals of the terminals PWR ONOFF and PWR ONOFF SENSE work effectively in active LOW. The input signal of the PWR ONOFF and EXT PWR ONOFF applied through the power key switch and the external switch respectively are used to allow the power supply to the whole control blocks of FIG. 1. With the power supply the CPU checks the signals of the PW ONOFF SENSE, etc. Further, the one-shot multivibrator may be stated to temporarily generate the pulse output to urge the signal REG CNT temporarily active in order for such CPU temporary operations for decision of the continuous operation.

In this case, conditions for the generation of the signal "MMOUT" shown in FIG. 1 are given as follows, for example.

Condition 1: the automatic pulse generation about 60 msec just after mounting of battery pack.

Condition 2: the automatic pulse generation about 60 msec with increase of output voltage of a battery pack already mounted which increases above a voltage threshold level (detected by battery voltage sensor circuits 12 and 18 having the respective threshold levels (3.8 V ±2.4%) and (3.6 V ±2.4%).

Condition 3: the automatic pulse generation about 60 msec under condition of current stable absorbing from battery pack and external power sources and just after switching of the input signal "IGN ONOFF" from "OFF" to "ON".

Thus, generation of "MMOUT" pulse=(condition 1) ∨ (condition 2) ∨ (condition 3).

As mentioned, according to the embodiment of the present invention, power is normally continuously supplied to the logic circuit block and the pulse generator circuit block of the CMOS power IC 21 receiving the power inputs supplied for establishing the necessary conditions for activating the portable radio telephone device. In the disclosed embodiment, the pulse signal is temporarily generated during which period the sufficient conditions required for the normal activation of the total device system are to be confirmed, so that the CPU can be made controllable between its non-operable state and its operable state. On the other hand, no power inputs are supplied to the whole system in the other period. Therefore, the quiescent current in the system can be greatly reduced. In the case of the embodiment of the present invention, the current consumption of the CMOS power IC 21 itself due to the supply of the battery voltage corresponds to the quiescent current in the portable radio telephone device in its power-off state. Thus, the quiescent current can be suppressed to less than 20 μA.

It will be understood from the foregoing description of the embodiment of the present invention that the method comprises the steps of (a) supplying a plurality of power inputs as factors for triggering generation of a pulse signal indicating establishment of necessary conditions required for normal activation of such a portable device, and (b) deciding to activate the device only when supplied power inputs satisfy sufficient conditions required for the activation of the device to perform its primary function, such as telephonic communication in the case of a portable radio telephone device. The above steps (a) and (b) are the secondary function of the device. Therefore, the power supply voltage is normally continuously supplied only to the logic circuit block and the pulse generator circuit block confirming establishment of the sufficient conditions required for the activation of the total device system, to perform its primary function so that the quiescent current in the system can be greatly reduced, and reactive or ineffective currents appearing when the system is not under operation can also be suppressed, thereby extending the useful service life of the external power source such as the battery.

I claim:

1. A quiescent-current reducing type electric-power supply control method for a device adapted to be fed power from at least one electric power source, said method comprising:

(a) detecting a predetermined necessary condition with respect to power input from at least one power source;

(b) generating a trigger pulse in response to detection of said predetermined necessary condition;

(c) detecting presence or absence of a predetermined sufficient condition with respect to power input from said at least one power source in response to said trigger pulse; and (d) starting continuous power supply from said at least one power source to said device in response to detection of said predetermined sufficient condition.

2. A method as in claim 1, wherein said steps (a)–(d) are preformed during a process of turning said device to an ON state from an OFF state.

3. A quiescent-current reducing type electric-power supply control method for a device including computing means and adapted to be enabled with power supplied from at least one electric power source, said method for reducing possible quiescent currents flowing from said at least one power source to said device and comprising:

(a) detecting a first predetermined condition of power input from at least one power source;

(b) generating a trigger pulse in response to detection of said first predetermined condition;

(c) enabling, in response to said trigger pulse and for a duration of said trigger pulse, said computing means to cause said computing means to detect presence or absence of a second predetermined condition of power input from said at least one power source for continuous enabling of said device; and (d) generating a signal for starting power supply from said at least one power source to said device for continuous enabling of said device in response to detection of the presence of said second predetermined condition in step (c).

4. A method as in claim 3, wherein said steps (a)–(d) are performed during a process of turning said device to an ON state from an OFF state.

5. A quiescent-current reducing type power supply control method for a portable radio telephone device including CPU means and adapted to be supplied with power from at least one power source of a plurality of electric power sources including an internal removable battery and an external power source for an external apparatus, said method for reducing possible quiescent currents from said at least one power source of said plurality of power sources and comprising:

(a) detecting a first predetermined condition of power input from said at least one power source of said plurality of power sources comprising at least first to fourth power sources wherein said first source is the removable battery, said second source is said external power source, said third source is a power output from said first source to be output under control of a timer, and said fourth source is a power output from said external power source to be output interlocked with operation of a switch of said external apparatus employing said external power source;

(b) generating a trigger pulse signal of a predetermined duration in response to detection of said first predetermined condition;

(c) enabling, in response to said trigger pulse, said CPU means for a duration of said trigger pulse to cause said CPU means to detect presence or absence of a second predetermined condition of power input from said at least one power source of said plurality of power sources in order to continuously enable said device; and (d) generating a signal for starting power supply from said at least one power source to said device in order to continuously enable said device in response to detection of the presence of said second predetermined condition.

6. A method as in claim 5, wherein said steps (a)–(d) are performed during a process of turning said device to an ON state from an OFF state.

7. A quiescent-current reducing type electric-power supply control method for a device adapted to be fed power from at least one electric power source, said method comprising:

(a) detecting a predetermined necessary condition of power input from at least one power source;

(b) generating a trigger pulse in response to detection of said predetermined necessary condition;

(c) detecting presence or absence of a predetermined sufficient condition of power input from at least one power source in response to said trigger pulse; and (d) starting continuous power supply from at least one power source to said device in response to detection of said predetermined sufficient condition, wherein said trigger pulse is a one-shot pulse.

8. A method as in claim 7, wherein said device includes a primary function and a secondary function, said secondary function including performance of said steps (a)–(d) and wherein, before step (a) is performed and unless said predetermined necessary condition and said predetermined sufficient condition are present, said device is in an inactive state in which no electric power is supplied for performance of said primary function.

9. A method as in claim 8, wherein said primary function comprises radio telephone communication.

10. A method as in claim 8, wherein said at least one power source comprises a first power source and a second power source and said predetermined necessary condition includes a condition that electric power being fed to said device is switched from said first power source to said second power source.

11. A method as in claim 10, wherein said predetermined necessary condition further includes a condition that power output from said at least one electric power source has decreased by a predetermined amount.

12. A quiescent-current reducing type electric-power supply control method for a device including computing means and adapted to be enabled with power supplied from at least one electric power source, said method for reducing possible quiescent currents flowing from said at least one power source to said device and comprising:

(a) detecting a first predetermined condition of power input from said at least one power source;

(b) generating a trigger pulse in response to detection of said first predetermined condition;

(c) enabling, in response to said trigger pulse and for a duration of said trigger pulse, said computing means to cause said computing means to detect presence or absence of a second predetermined condition of power input from said at least one power source for continuous enabling of said device; and (d) generating a signal for starting power supply from said at least one power source to said device for continuous enabling of said device in response to detection of the presence of said second predetermined condition in step (c), wherein said trigger pulse is a one-shot pulse.

13. A method as in claim 12, wherein said device includes a primary function and a secondary function, said secondary function including performance of said steps (a)–(d) and wherein, before step (a) is performed and unless said first predetermined condition and said second predetermined condition are present, said device is in an inactive state in which no electric power is supplied for performance of said primary function.

14. A method as in claim 13, wherein said primary function comprises radio telephone communication.

15. A method as in claim 13, wherein said at least one power source comprises a first power source and a second power source and said first predetermined condition includes a condition that electric power being fed to said device is switched from said first power source to said second power source.

16. A method as in claim 15, wherein said first predetermined condition further includes a condition that power output from said at least one electric power source has decreased by a predetermined amount.

17. A quiescent-current reducing type power supply control method for a portable radio telephone device including CPU means and adapted to be supplied with power from at least one power source of a plurality of electric power sources including an internal removable battery and an external power source for an external apparatus, said method for reducing possible quiescent currents from said at least one power source of said plurality of power sources and comprising:

(a) detecting a first predetermined condition of power input from said at least one power source of said plurality of power sources comprising at least first to fourth power sources wherein said first source is the removable battery, said second source is said external power source, said third source is a power output from said first source to be output under control of a timer, and said fourth source is a power output from said external power source to be output interlocked with operation of a switch of said external apparatus employing said external power source;

(b) generating a trigger pulse signal of a predetermined duration in response to detection of said first predetermined condition;

(c) enabling, in response to said trigger pulse, said CPU means for a duration of said trigger pulse to cause said CPU means to detect presence or absence of a second predetermined condition of power input from said at least one power source of said plurality of power sources in order to continuously enable said device; and (d) generating a signal for starting power supply from said at least one power source to said device in order to continuously enable said device in response to detection of the presence of said second predetermined condition, wherein said trigger pulse is a one-shot pulse.

18. A method as in claim 17, wherein said device includes a primary function and a secondary function, said secondary function including performance of said steps (a)–(d) and wherein, before step (a) is performed and unless said first predetermined condition and said second predetermined condition are present, said device is in an inactive state in which no electric power is supplied for performance of said primary function.

19. A method as in claim 18, wherein said primary function comprises radio telephone communication.

20. A method as in claim 18, wherein said first predetermined condition includes a condition that electric power being fed to said device is switched from one of said first to fourth power sources to another of said first to fourth power sources.

21. A method as in claim 20, wherein said first predetermined condition further includes a condition that power output from one of said first to fourth power sources has decreased by a predetermined amount.

22. A portable radio telephone device for being powered selectively by one of an internal battery and an external power source, said device comprising:

a logic circuit continuously receiving power from one of said internal battery and said external power source and including means for detecting a predetermined necessary condition of power input to said logic circuit from said internal battery and said external power source; and a pulse generator circuit for continuously receiving power from one of said internal battery and said external power source and including means for generating a trigger pulse in response to detection of said predetermined necessary condition by said logic circuit; and wherein:

said logic circuit further includes means for detecting a predetermined sufficient condition of power input to said logic circuit from at least one of said internal battery and said external power source in response to said trigger pulse and generating a signal to start continuous power supply from one of said internal battery and said external power source to activate said device to perform a radio telephone communication function in response to detection of said predetermined sufficient condition.

23. A device as in claim 22, wherein said trigger pulse is a one-shot pulse.

24. A device as in claim 23, wherein said device is never activated to perform said radio telephone communication function unless said predetermined necessary condition and said predetermined sufficient condition are determined to be present.

25. A device as in claim 24, wherein said predetermined necessary condition includes a condition that electric power being fed to said device is switched from one of said internal battery and said external power source to the other of said internal battery and said external power source.

26. A device as in claim 25, wherein said predetermined necessary condition further includes a condition of a predetermined amount of decrease of power output from one of said internal battery and said external power source.

27. A device as in claim 26, wherein said device further includes a computing means and said logic circuit enables said computing means, for a duration of said trigger pulse, to detect said predetermined sufficient condition.

28. A device as in claim 27, wherein said computing means is a CPU.

29. A quiescent-current reducing type electric-power supply control method for a device adapted to be fed power selectively from at least two electric power sources, said method comprising, during a process of switching power supply for said device from one power source of said at least two power sources to another power source of said at least two power sources:

(a) detecting a predetermined necessary condition with respect to power input from at least two power sources;

(b) generating a trigger pulse in response to detection of said predetermined necessary condition;

(c) detecting presence or absence of a predetermined sufficient condition with respect to power input from said at least two power sources in response to said trigger pulse; and (d) starting continuous power supply from one of said at least two power sources to said device in response to detection of said predetermined sufficient condition.

30. A quiescent-current reducing type electric-power supply control method for a device including computing means and adapted to be enabled with power supply from at least two electric power sources, said method for reducing possible quiescent currents flowing from said at least two power sources to said device and comprising, during a process of switching power supply for said device from one power source of said at least two power sources to another power source of said at least two power sources:

(a) detecting a first predetermined condition of power input from said at least two power sources;

(b) generating a trigger pulse in response to detection of said first predetermined condition;

(c) enabling, in response to said trigger pulse and for a duration of said trigger pulse, said computing means to cause said computing means to detect presence or absence of a second predetermined condition of power input from said at least two power sources for continuous enabling of said device; and (d) generating a signal for starting power supply from one of said at least two power sources to said device for continuous enabling of said device in response to detection of the presence of said second predetermined condition in step (c).

31. A quiescent-current reducing type power supply control method for a portable radio telephone device including CPU means and adapted to be supplied with power selectively from at least four electric power sources including an internal removable battery and an external power source for an external apparatus, said method for reducing possible quiescent currents from said at least four power sources and comprising, during a process of switching power supply for said device from one power source of said at least four power sources to another power source of said at least four power sources:

(a) detecting a first predetermined condition of power input from said at least four power sources comprising at least first to fourth power sources wherein said first source is the removable battery, said second source is said external power source, said third source is a power output from said first source to be output under control of a timer, and said fourth source is a power output from said external power source to be output interlocked with operation of a switch of said external apparatus employing said external power source;

(b) generating a trigger pulse signal of a predetermined duration in response to detection of said first predetermined condition;

(c) enabling, in response to said trigger pulse, said CPU means for a duration of said trigger pulse to cause said CPU means to detect presence or absence of a second predetermined condition of power input from said at least four power sources in order to continuously enable said device; and (d) generating a signal for starting power supply from one of said at least four power sources to said device in order to continuously enable said device in response to detection of the presence of said second predetermined condition.

* * * * *